(12) United States Patent
Riahi et al.

(10) Patent No.: US 8,277,169 B2
(45) Date of Patent: Oct. 2, 2012

(54) TURBINE ROTOR COOLING FLOW SYSTEM

(75) Inventors: Ardeshir Riahi, Scottsdale, AZ (US);
Frederick G. Borns, Chandler, AZ (US);
Vivek Agarwal, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 2099 days.

(21) Appl. No.: 11/155,399

(22) Filed: Jun. 16, 2005

(65) Prior Publication Data
US 2006/0285968 A1    Dec. 21, 2006

(51) Int. Cl.
*F01D 5/08* (2006.01)

(52) U.S. Cl. ....... 415/115; 415/151; 415/176; 416/96 R; 416/97 R

(58) Field of Classification Search .......... 415/115; 416/96 R, 97 R
See application file for complete search history.

(56) References Cited

U.S. PATENT DOCUMENTS

| | | | |
|---|---|---|---|
| 2,811,833 A | 11/1957 | Broffitt | |
| 3,031,128 A * | 4/1962 | Rubbra | 417/293 |
| 4,217,755 A | 8/1980 | Williams | |
| 4,708,588 A | 11/1987 | Schwarz et al. | |
| 5,310,319 A * | 5/1994 | Grant et al. | 416/220 R |
| 5,399,066 A * | 3/1995 | Ritchie et al. | 415/115 |
| 5,575,616 A | 11/1996 | Hagle et al. | |
| 5,984,636 A * | 11/1999 | Fähndrich et al. | 416/96 R |
| 5,996,331 A | 12/1999 | Palmer | |
| 6,173,735 B1 * | 1/2001 | Perry et al. | 137/489 |
| 6,183,193 B1 | 2/2001 | Glasspoole et al. | |
| 6,220,336 B1 * | 4/2001 | Smith | 164/453 |
| 6,415,736 B1 * | 7/2002 | Hao et al. | 118/723 E |
| 6,468,032 B2 * | 10/2002 | Patel | 415/115 |
| 6,481,211 B1 * | 11/2002 | Haas | 60/782 |

OTHER PUBLICATIONS

Earl Rogan et al., Handbook of Turbomachinery, 2003, CRC Press, cover.*
Earl Rogan et al., Handbook of Turbomachinery, 2003, CRC Press, pp. 173-174.*

* cited by examiner

*Primary Examiner* — Ninh H Nguyen
(74) *Attorney, Agent, or Firm* — Ingrassia Fisher & Lorenz, P.C.

(57) ABSTRACT

Disclosed herein is an apparatus comprising a disk coverplate for a turbine rotor, the disk coverplate comprising a plurality of cooling holes, wherein the distance between the centers of any two adjacent cooling holes is greater than twice the average diameter of the two adjacent cooling holes. A method to control turbine cooling air flow is also disclosed.

12 Claims, 5 Drawing Sheets

TURBINE ROTOR COOLING FLOW SYSTEM

STATEMENT REGARDING FEDERALLY SPONSORED RESEARCH OR DEVELOPMENT

This invention was made with support of the United States Government under Contract No. DAAH10-03-2-0007 issued by the U.S. Army. The Government may have certain rights to this invention.

BACKGROUND OF THE INVENTION

The present invention generally relates to apparatus and methods for providing a cooling flow to a high pressure turbine rotor. More specifically, the present invention relates to apparatus and methods relating to providing a cooling flow to a turbine rotor by controlling the size and thus the spacing of cooling holes through a disk coverplate.

Turbine engines may include a compressor section, wherein inlet air is compressed, followed by a combustor section wherein fuel is combusted with the compressed air to generate exhaust gas. The exhaust gas is then directed to a turbine section, wherein energy is extracted from the exhaust gas.

The turbine section may comprise a rotor assembly. The rotor assembly may include a plurality of turbine blades installed on a rotatable disk. During operation, the turbine blades, the rotating disk, and other components of the turbine section may be exposed to elevated gas path temperatures, and thus may require cooling. Cooling may be provided to turbine section components using cooling air extracted from other parts of the engine. For example, cooling air may be supplied from the combustor plenum. Cooling air may be bled from the combustor plenum at compressor-discharge conditions and directed to the rotor assembly through a stationary Tangential OnBoard Injector (TOBI). The cooling air is directed by the TOBI at cooling holes disposed through a rotating disk coverplate, which is attached to the rotor assembly. The cooling holes serve as an inlet for cooling air, and are in fluid communication with the turbine blades. A portion of the cooling air leaving the TOBI traverses the distance between the TOBI exit and enters the cooling holes, which ultimately provides cooling to the turbine blades.

It is common in the art to provide a maximum number of cooling holes in the disk coverplate. The number of cooling holes in the disk coverplate must also be balanced with maintaining the physical integrity of the turbine rotor assembly. Typically, the distance between the cooling holes is less than or equal to twice the average diameter of two adjacent holes. This so called "50%" spacing allows for the maximum number of holes while maintaining adequate strength and integrity of the turbine rotor assembly. At less than full power however, these practices result in wasted energy and thus a diminution in overall engine efficiency.

To insure the turbine rotor assembly's mechanical integrity, it is also important to supply a portion of the cooling air to a purge cavity upstream of the rotor assembly. Thus, the cooling air which exits the TOBI but does not enter the cooling holes, is directed to a purged cavity which prevents hot gas-path flow ingestion into unwanted areas of the turbine section.

The cooling effectiveness of the blade is a strong function of the amount of cooling air and the pressure level at which the cooling air is supplied to the blade. Increased flow rates of cooling airflow combined with elevated coolant supply pressure can be used to improve blade cooling effectiveness. However, since cooling airflows do not contribute work to the turbine, excessive cooling air flow results in an undesirable increase in engine Specific Fuel Consumption (SFC) and reduces specific power of the gas turbine engine.

Typically, the turbine blades are only subjected to high gas temperatures and stresses at high engine power settings (i.e., full power), while at lower power settings, the blade does not need to be aggressively cooled. Hence, it would be beneficial to reduce the amount of cooling flow at less than full power settings, while still being able to maintain an adequate cooling air flow during full power settings.

SUMMARY OF THE INVENTION

In one aspect of the present invention, an apparatus comprises a disk coverplate for a turbine rotor, the disk coverplate comprising a plurality of cooling holes, wherein the distance between the centers of any two adjacent cooling holes is greater than twice the average diameter of the two adjacent cooling holes.

In another aspect of the present invention, an apparatus comprises a disk coverplate, the disk coverplate comprising a plurality of cooling holes, the cooling holes being in fluid communication with a flow of cooling air emanating from a tangential onboard injection nozzle, the disk coverplate disposed on a rotor assembly of a gas turbine engine, wherein the cooling holes are in fluid communication with a cooling conduit disposed within the rotor assembly for directing the flow of cooling air to provide cooling to a turbine blade of the gas turbine engine, wherein the distance between the centers of any two adjacent cooling holes is greater than twice the average diameter of the two adjacent cooling holes.

In still another aspect of the present invention, a gas turbine engine comprises a compressor section, a combustor section, and a turbine section, wherein the turbine section comprises a rotor assembly, the rotor assembly comprising a disk coverplate comprising a plurality of cooling holes, the cooling holes being in fluid communication with a flow of cooling air emanating from a tangential onboard injection nozzle, wherein the cooling holes are in fluid communication with a cooling conduit for directing the flow of cooling air to provide cooling to a turbine blade disposed on the rotor assembly of the gas turbine engine, wherein the distance between the centers of any two adjacent cooling holes is greater than twice the average diameter of the two adjacent cooling holes.

In yet another aspect of the present invention, a gas turbine engine comprises a compressor section, a combustor section, and a turbine section, wherein the turbine section comprises a rotor assembly, the rotor assembly comprising a disk coverplate comprising a plurality of cooling holes, the cooling holes being in fluid communication with a flow of cooling air emanating from a tangential onboard injection nozzle, wherein the coverplate holes are in fluid communication with a cooling conduit, the cooling air conduit being inwardly oriented in a direction of rotation of the rotor assembly for directing the flow of cooling air to provide cooling to a turbine blade disposed on the rotor assembly of the gas turbine engine, wherein the distance between the centers of any two adjacent cooling holes is greater than twice the average diameter of the two adjacent cooling holes, wherein each of the cooling holes have the same diameter, wherein the cooling holes are uniformly spaced radially about the disk coverplate, wherein the cooling air is produced in a combustion plenum of the combustor section, wherein the cooling air is supplied to the tangential onboard injection nozzle through a solenoid valve capable of being controlled via one or more feedback connections, and wherein the cooling air is supplied to the tangential onboard injection nozzle through a heater.

In a further aspect of the present invention, a system to control turbine cooling air flow in a gas turbine engine comprises a rotor assembly comprising a disk coverplate comprising a plurality of cooling holes, the cooling holes being in fluid communication with a flow of the cooling air emanating from a tangential onboard injection nozzle, wherein the coverplate holes are in fluid communication with a cooling conduit, the cooling air conduit being inwardly oriented in a direction of rotation of the rotor assembly for directing the flow of cooling air to provide cooling to a turbine blade disposed on the rotor assembly of the gas turbine engine, wherein the distance between the centers of any two adjacent cooling holes is greater than twice the average diameter of the two adjacent cooling holes.

In yet still another aspect of the present invention, a method to control turbine cooling air flow comprises the steps of a) setting a tangential onboard injector velocity of a flow of cooling air to be equal to a tangential velocity of at least one of a plurality of cooling holes of a disk coverplate, when the gas turbine engine is operating at a maximum power, the coverplate disposed on a rotor assembly of a gas turbine engine; wherein the tangential onboard injector velocity is defined as the tangential component of the velocity of the cooling air flow emanating from a tangential onboard injection nozzle, wherein at least one of the plurality of cooling holes are in fluid communication with a cooling conduit to provide cooling to a turbine blade of the gas turbine engine; and b) arranging a plurality of the cooling holes radially about the disk coverplate such that the distance between the centers of any two adjacent cooling holes is greater than twice the average diameter of the two adjacent cooling holes.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a disk coverplate for use in a gas turbine engine, useful in commercial or military aircraft, including fixed wing aircraft, rotorcraft, and the like. The disk coverplate may comprise a plurality of cooling holes; wherein the distance between the centers of any two adjacent cooling holes is greater than twice the average diameter of the two cooling holes. The present invention also provides a method for controlling cooling flow to a high-pressure turbine rotor via the coverplate, wherein the cooling flow supplied to the high-pressure turbine rotor can be decreased, without compromising the turbine's durability and integrity, such that the engine's specific fuel consumption (SFC) can be improved.

It is common in the art to optimize TOBI exit pressure (see $P_{exit}$ 48 below) to deliver a desired flow of blade cooling air and purge air only at full engine power. It is also common in the art to provide a maximum number of cooling holes in the coverplate (i.e., cooling holes radially arranged about a disk coverplate, wherein cooling hole size is such that the distance between any two adjacent cooling holes is less than or equal to twice the average diameter of the two adjacent holes). At less than full power, however, these practices result in wasted energy and thus a diminution in overall engine efficiency.

The spacing of the cooling holes in the disk coverplate of the present invention allows for a novel blade cooling air supply system in which the split between the amount of cooling air directed to the turbine blades via cooling holes in the coverplate and the amount of cross-flow cooling air directed to purge the disk cavity from hot-gas ingestion may be varied without compromising the overall integrity of the rotor assembly or engine performance at different power settings. This is in contrast to the prior art wherein cooling flow to the turbine blades is set for full power operation, resulting in wasted power at lower engine settings.

Figure 1:
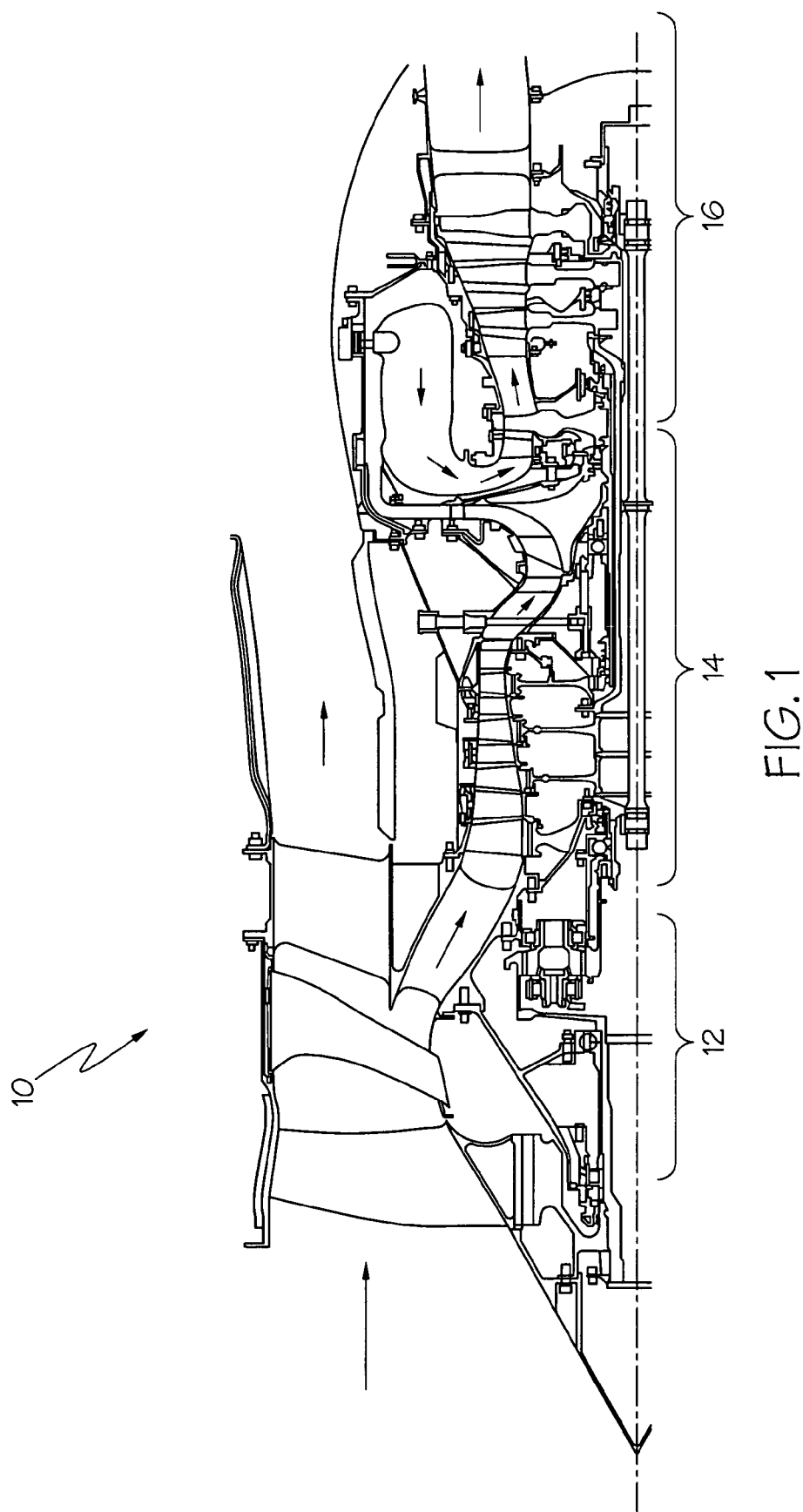
FIG. 1 is a partial cross-sectional view of a gas turbine engine of the present invention.
Figure 2:
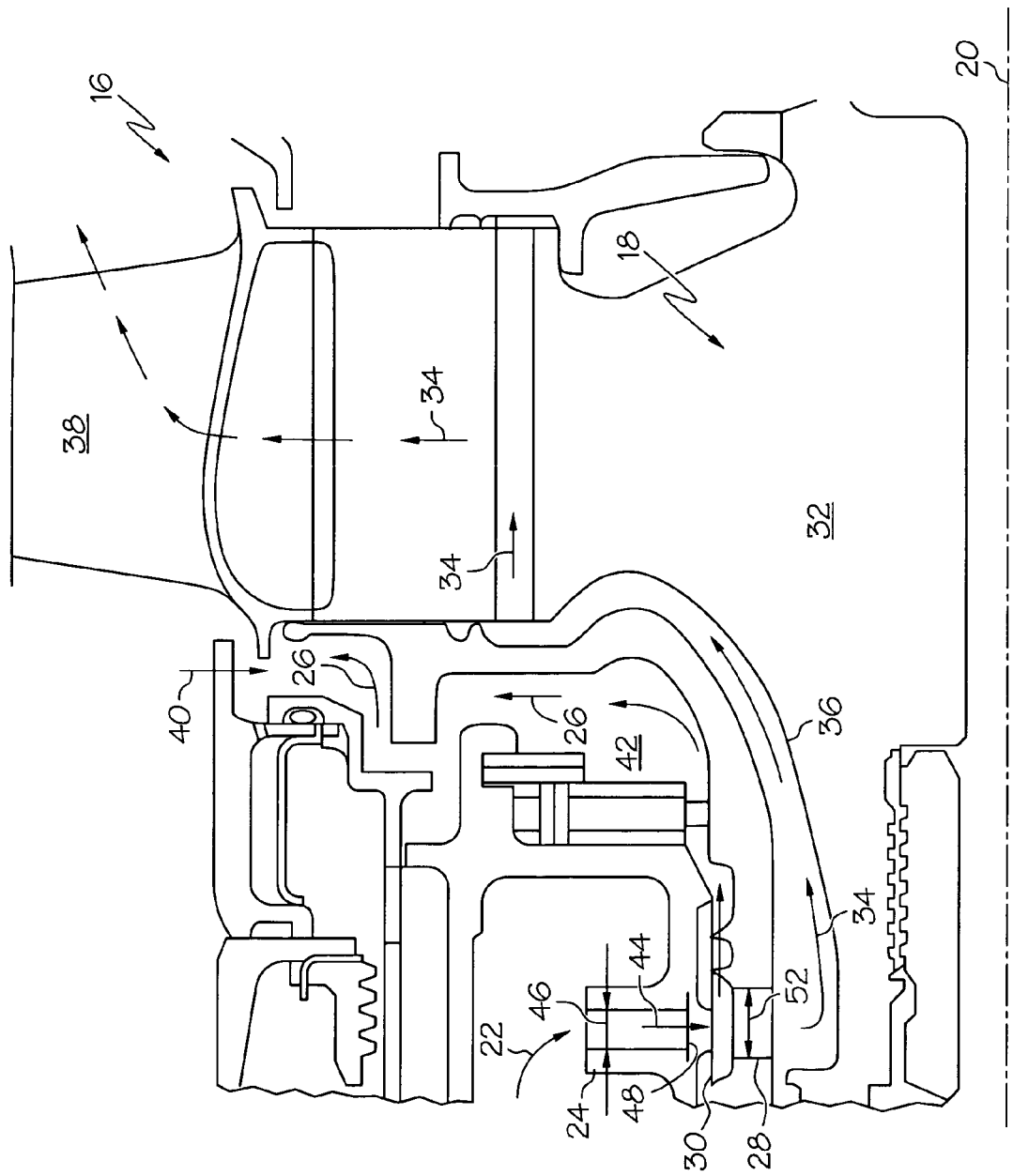
FIG. 2 is a cross-sectional view of a rotor assembly of a gas turbine engine of the present invention.

As shown in FIG. 1, an embodiment of the present invention may include a gas turbine engine 10 comprising a compressor section 12, a combustor section 14, and a turbine section 16. As shown in FIG. 2, which depicts a portion of turbine section 16 of an embodiment of the present invention, turbine section 16 may comprise a turbine rotor assembly 18 capable of rotation about a central axis 20. Cooling air 22 may be bled from the compressor section 12 and passed through a radial tangential onboard injector (TOBI) 24. At TOBI 24, a split in cooling air 22 may occur. A portion of cooling air 22 may be split into purge air 26, which may be provided to purge a disk cavity 42. Another portion of cooling air 22 may be split into blade cooling air 34 and then passed through a series of openings, in a disk coverplate 30 referred to herein as cooling holes 28. Cooling holes 28 are thus disposed through disk coverplate 30 which is located upstream from and affixed to disk 32. Blade cooling air 34 may then be directed into one or more of a cooling conduit 36 to provide cooling of turbine blade 38. Disk coverplate 30 insures that a portion of cooling air 22 is directed towards turbine blade 38, and is not leaked out into the gas-path upstream of turbine blade 38.

TOBI 24 may function to impart tangential swirl 44 to cooling air 22, such that the exit tangential velocity of cooling air 22 may closely match that of rotating cooling holes 28 located through disk coverplate 30. To achieve tangential swirl 44, holes may be disposed in TOBI 24 at an angle inclined with respect to central axis 20, as is known in the art. The total number of holes in TOBI 24 and the diameter 46 may be set by at least three factors:

1. the area required to pass a sufficient amount of cooling air 22;
2. the available supply pressure of cooling air 22, referred to herein as $P_{coolant}$; and
3. the coolant pressure at the exit of TOBI 24, referred to as $P_{exit}$ 48. $P_{exit}$ 48 may be dictated by two pressure requirements. First, $P_{exit}$ 48 may be set to be higher than the pressure of gas-path static pressure, upstream of turbine blade 38, referred to herein as $P_{g\_hub}$ 40. This may insure a cooling flow supply satisfactory to purge disk cavity 42 of hot-gas ingestion. Secondly, TOBI exit pressure $P_{exit}$ 48 may be set by the demand to pass an adequate flow of blade cooling air 34 through cooling conduit 36 and in contact with turbine blade 38 at particular power settings. These two pressure requirements are complementary at elevated engine power settings, referred to herein as maximum power (i.e., at or near the maximum rated power for a particular gas turbine engine) where high TOBI exit pressure Pexit 48 is desirable to insure an adequate flow of blade cooling air 34 to turbine blades 38 and sufficient purge air 26 into disk cavity 42. At lower power settings (i.e., at power settings below a maximum power setting), the pressure requirement demanded to maintain a flow of purge air 26 into disk cavity 42 (i.e., disk cavity purge) may be higher than a TOBI exit pressure $P_{exit}$ 48 which may be required to insure a satisfactory flow of blade cooling air 34.

The flow of cooling air 22 required to purge disk cavity 42 and cool blade 38 may be supplied through TOBI 24. A pressure-drop may be sustained as cooling air 22 flow traverses through cooling holes 28 in disk coverplate 30, wherein each cooling hole 28 is a rotating orifice. The pressure drop through cooling holes 28 may be a function of the size (i.e., cooling hole diameter 52) and a discharge coefficient. The discharge coefficient for flow through cooling hole 28 may be influenced by the ratio of the tangential velocity (relative to the hole) of cooling air 22, compared to the velocity of blade cooling air 34 through cooling hole 28. Both of these velocities may be expressed in terms of Mach number. The tangential velocity of cooling air 22 exiting TOBI 24, divided by the tangential velocity of the cooling holes 28, may be referred to as the "swirl ratio". A swirl ratio greater than 1.0 implies the cooling air 22 exiting TOBI 24 is "overswirled" relative to cooling holes 28. The relative Mach number of cooling air exiting the TOBI, flowing tangentially in the portion of cavity 30 directly outboard of the cooling holes 28 and relative to the tangential velocity of the cooling holes 28, is referred to as the "shaft" Mach number (Mns). The Mach number of blade cooling air 34 flowing through cooling holes 28 may be referred to as the "hole" Mach number $Mn_{hole}$). The parameter $Mns/Mn_{hole}$ may be used to correlate the discharge coefficient of rotating cooling holes 28, as is well known in the art.

The shaft Mach number (Mns) is the Mach number $Mn_{gas}$ of the portion of purge air 26 flowing tangentially subtracted by the tangential velocity of cooling hole 28 itself (expressed in terms of Mach number, $Mn_{hole}$) and is a function of swirl ratio and the rotational speed (RPM) of coverplate 30, i.e.:

$$Mns = Mn_{gas} - Mn_{hole}$$
$$= Mn_{hole} \times [Mn_{gas}/Mn_{hole} - 1]$$
$$= Mn_{hole} \times [\text{Swirl ratio} - 1]$$
$$Mn_{hole} \; \alpha RPM$$

So that:

$$Mns \; \alpha RPM \times [\text{Swirl Ratio} - 1]$$

It can be seen that as the swirl ratio approaches 1.0, Mns decreases (and hence, $Mns/Mn_{hole}$ decreases) and a higher discharge coefficient results.

At or near full engine power, the pressure ratio across TOBI 24 may be maximized in order to achieve high cooling flow swirl ratio (high discharge coefficient across cooling holes 28), which reduces pressure loss across disk coverplate 30.

Figure 3:
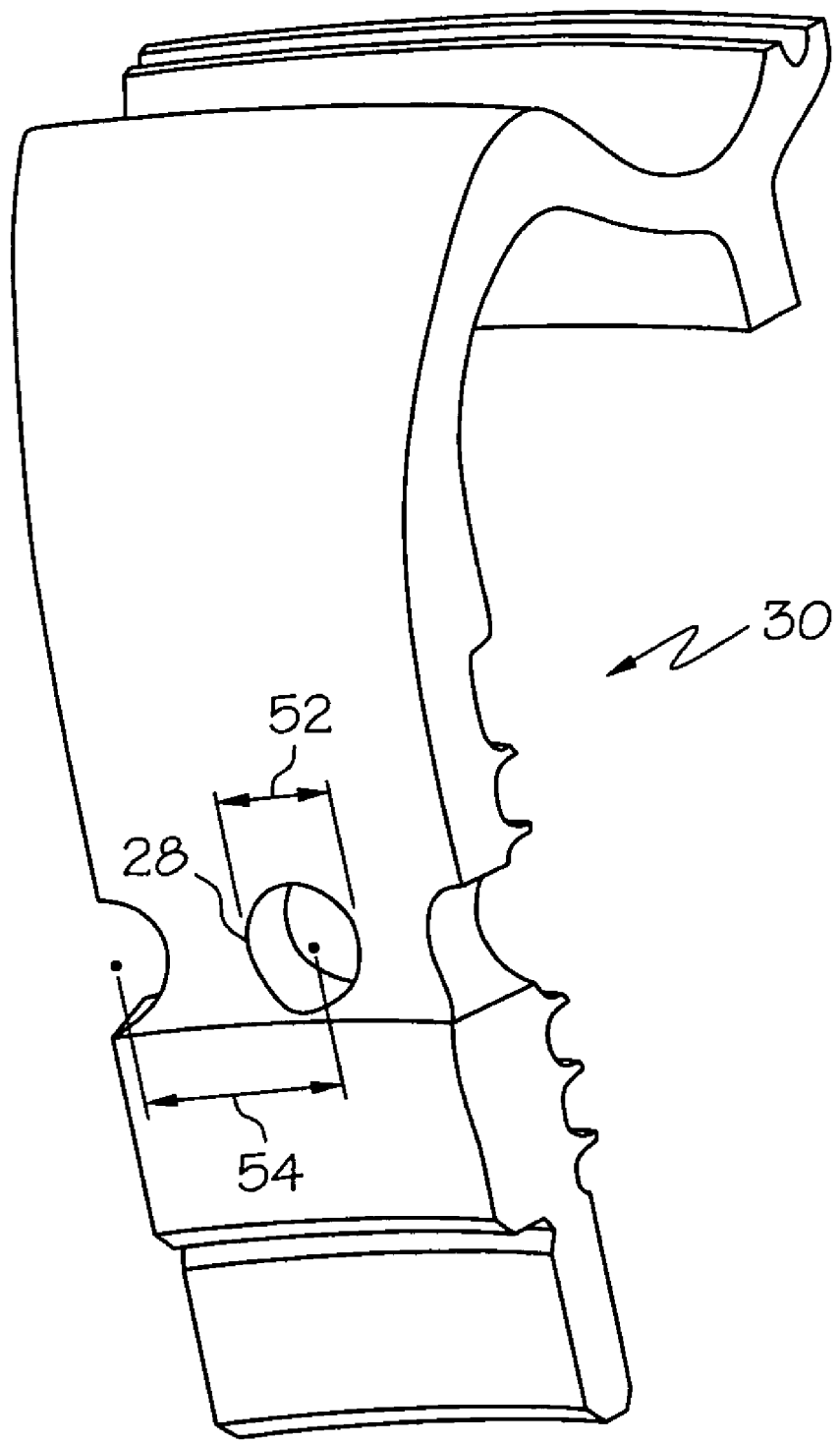
FIG. 3 is a perspective view of a $\frac{1}{24}^{th}$ section of a disk coverplate of the present invention.

FIG. 3 shows a perspective view of a $\frac{1}{24}^{th}$ section of an embodiment of disk coverplate 30 of the present invention. Cooling holes 28 are shown disposed through disk coverplate 30. In disk coverplates known in the prior art (not shown), the area of the cooling holes was maximized within the limits of providing structural integrity to the coverplate. The maximum distance between the centers of an adjacent pair of the cooling holes was typically equal to twice the diameter of each of the cooling holes. This spacing and thus cooling hole size provided the maximum flow of blade cooling air.

It has been discovered herein that further spacing of cooling holes 28 about disk coverplate 30 (and thus reducing diameter 52 of cooling holes 28) results in less wasted energy at engine settings which are less than the maximum setting (full power) for a particular gas turbine engine. Accordingly, in an embodiment of the present invention, the area of the cooling holes 28 may be substantially less than the maximum cooling hole area within the limits of providing structural integrity to coverplate 30. In some embodiments of the present invention, disk coverplate 30 may comprise a plurality of cooling holes 28, wherein the distance between the centers of any two adjacent cooling holes 28 may be greater than twice the average diameter 52 of the two adjacent cooling holes 28.

In an embodiment of the present invention, the maximum distance between the centers of two adjacent cooling holes 28 in a disk coverplate 30 (referred to as a spacing distance 54) may be greater than twice diameter 52 (i.e., greater than 2 times diameter 52, or 54>2(52)) of cooling holes 28. In another embodiment, spacing distance 54 may be 2.5 times diameter 52, 3 times diameter 52, 3.5 times diameter 52, 4 times diameter 52, 4.5 times diameter 52, 5 times diameter 52, 5.5 times diameter 52, 6 times diameter 52, 6.5 times diameter 52, 7 times diameter 52, 7.5 times diameter 52, 8 times diameter 52, 9 times diameter 52, or 10 times diameter 52.

In an embodiment, cooling holes 28 may be uniform in size in that they all comprise the same diameter 52. In still another embodiment, cooling holes may be uniformly spaced radially about disk coverplate 30.

Accordingly, in an embodiment of the present invention, a disk coverplate 30, disposed on a rotor assembly 18 of a gas turbine engine 10, may comprise a plurality of cooling holes 28 in fluid communication with a flow of cooling air 22 emanating from TOBI 24, wherein cooling holes 28 may be in fluid communication with cooling conduit 36 disposed within rotor assembly 18 for directing the flow of cooling air 22 to provide cooling to turbine blades 38 of gas turbine engine 10, wherein the distance (spacing distance 54) between the centers of any two adjacent cooling holes 28 is greater than twice the average diameter 52 of the two adjacent cooling holes 28.

Figure 4:
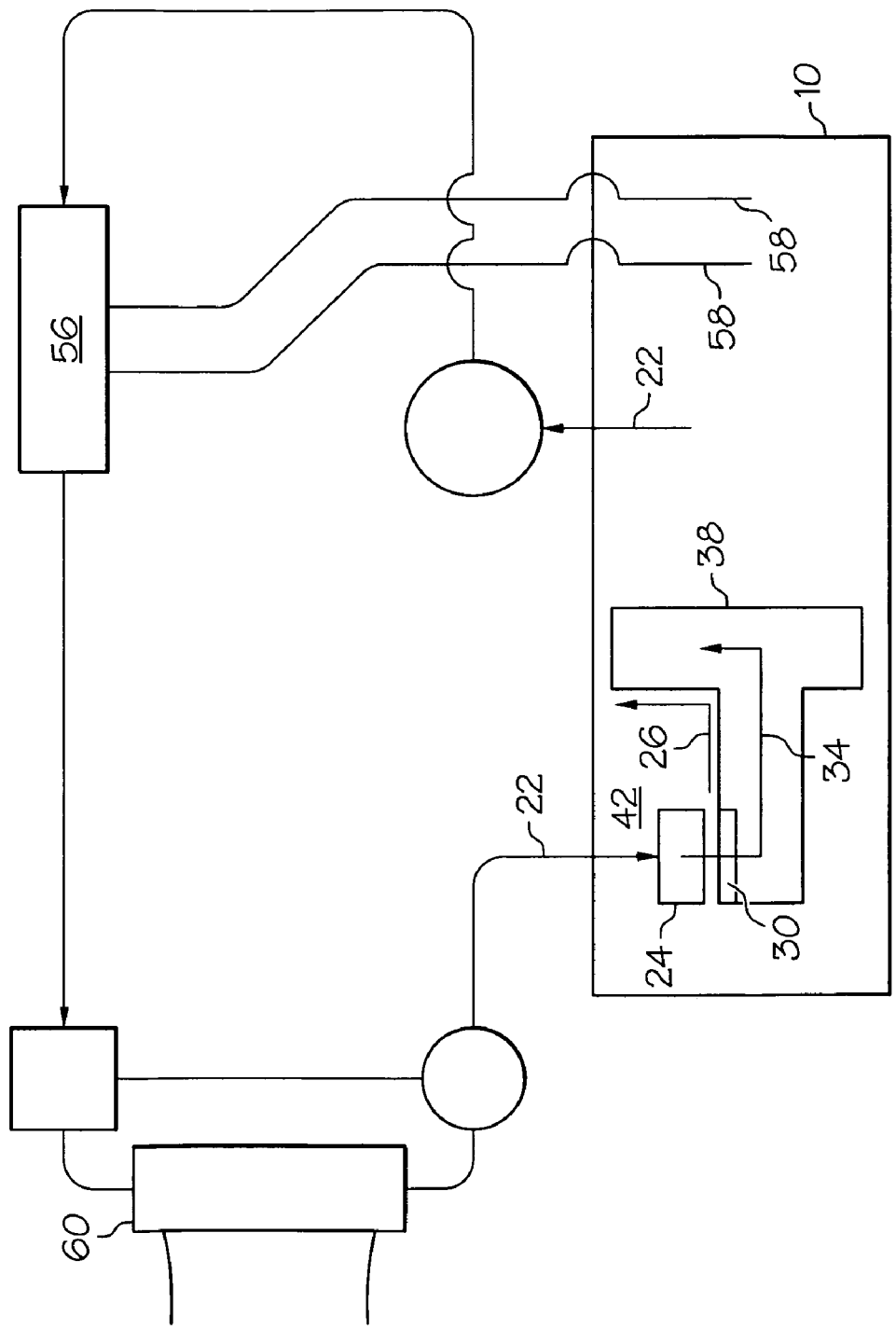
FIG. 4 is a block diagram of a cooling flow system of the present invention.

Likewise, in an embodiment of the present invention, gas turbine engine 10 may comprise compressor section 12, combustor section 14, and turbine section 16, wherein turbine section 16 may comprise rotor assembly 18 comprising disk coverplate 30 Coverplate 30 may comprise a plurality of cooling holes 28 in fluid communication with a flow of cooling air 22 emanating from TOBI 24. Cooling holes 28 may be equally radially spaced on coverplate 30. Cooling holes 28 may be in fluid communication with cooling conduit 36 for directing the flow of blade cooling air 34 to provide cooling to turbine blades 38 disposed on rotor assembly 18 of gas turbine engine 10, wherein the spacing distance 54 between the centers of any two adjacent cooling holes 28 may be greater than twice the average diameter 52 of the two adjacent cooling holes 28. In another embodiment of the present invention, shown in block diagram form in FIG. 4, TOBI inlet pressure ($P_{coolant}$) of cooling air 22 may be controlled by the use of a valve 56, e.g., an external solenoid valve. As shown, a bleed of cooling air 22 taken from gas turbine engine 10 may be directed through a valve 56 which may be controlled via various feedback control connections 58. Such feedback control may be based on parameters such as pressure, temperature, mass flow, and the like. Cooling air 22 may then be heated in a heater 60, e.g., a heat exchanger, a resistive heater, and the like, or may simply be directed to TOBI 24, wherein a portion of cooling air 22 may be split into purge air 26, and a portion of cooling air 22 traverses cooling holes 28 through disk coverplate 30 to become blade cooling air 34.

In an embodiment, throttling of cooling air 22 at less than full power may be accomplished using valve 56 which may be used to optimize TOBI exit pressure $P_{exit}$ 48 to insure adequate purging of disk cavity 42, while preventing wasted energy in the form of excess blade cooling air 34. Such external throttling may have the effect of lowering the swirl ratio at the inlet to cooling holes 28. Reduced swirl ratio (less than 1.0) increases the $Mns/Mn_{hole}$ ratio, which reduces the discharge coefficient of cooling holes 28. Because discharge coefficient operates on the head-loss effect of flow velocity through cooling holes 28, larger spacing distance 54 (i.e., smaller cooling holes 28) with elevated through-hole velocities, will realize the effect of reduced discharge coefficient more dramatically than would larger prior art cooling holes (i.e., the centers of cooling holes spaced at twice the diameter of two adjacent cooling holes, not shown). Cooling holes 28 on disk coverplate 30 may thus be spaced and sized to deliver the required flow of cooling air 22 to turbine blade 38 at lower than full power settings. Since at full or maximum power settings, the discharge coefficient of cooling holes 28 is high relative to the flow of cooling air 22, the impact of the cooling hole spacing (spacing distance 54) on the flow of blade cooling air 34 is minimal. At part power, since the discharge coefficient of cooling hole 28 is small relative to the flow of cooling air 22, cooling hole diameter 52 and spacing distance 54 may significantly impact the flow rate of cooling air 22 through cooling holes 28.

It can be seen that the flow of blade cooling air 34 can be adjusted to engine power levels through a combination of flow metering of cooling air 22 in conjunction with TOBI 24, and the size and spacing of cooling holes 28 in rotating coverplate 30. For example, cooling holes 28 may be spaced at greater than two times the distance of the centers of two adjacent cooling holes 28. In addition, external flow metering employing a solenoid valve 56 may be used to modify the pressure ratio across TOBI 24, which in turn may modulate the discharge coefficient of a set of cooling holes 28 that receive a flow of cooling air 22 through rotating disk coverplate 30. Among the parameters used to optimize part-power cooling air flow are the TOBI exit Mach number, the cooling hole diameter 52, and the radial spacing distance 54 of cooling holes 28.

Figure 5:
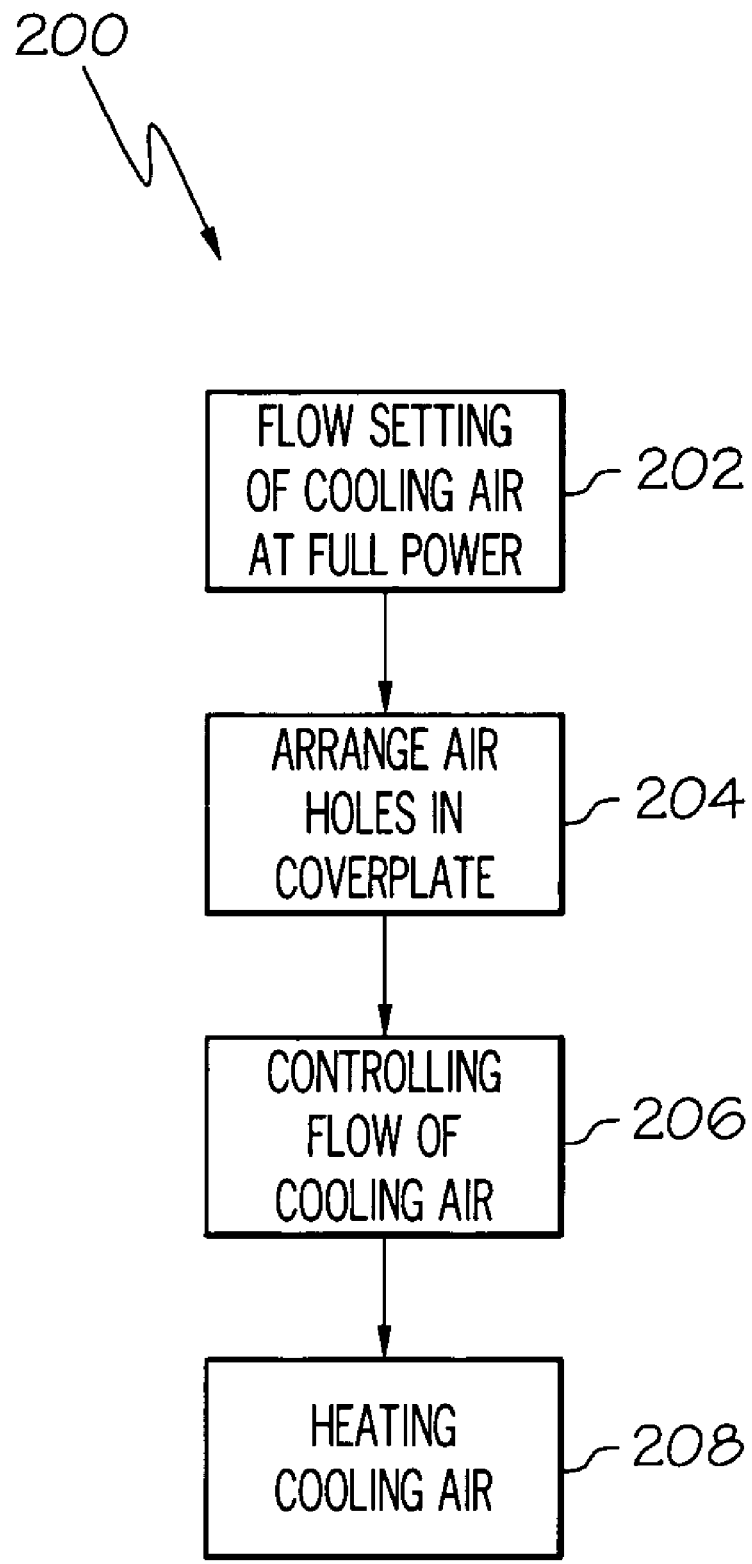
FIG. 5 is a flowchart showing the steps of a method of the present invention.

As shown in the block diagram of FIG. 5, an embodiment of the present invention may also include a method 200 of controlling turbine blade cooling air flow (method 200) comprising a flow setting step 202, wherein a tangential onboard injector velocity of a flow of cooling air 22 is set to be equal to a tangential velocity of cooling hole 28 in the disk coverplate 30 disposed on rotor assembly 18 of gas turbine engine 10, when the gas turbine engine 10 is operating at a maximum power, wherein the tangential onboard injector velocity is defined as the tangential component of the velocity of cooling air 22 flow emanating from TOBI 28, wherein the cooling holes 28 are in fluid communication with cooling conduit 36 to provide cooling to turbine blade 38 of gas turbine engine 10. Method 200 may further comprise an arranging step 204, wherein cooling holes 28 are arranged radially about disk coverplate 30 such that the spacing distance 54 between the centers of any two adjacent cooling holes 28 is greater than twice the average diameter 52 of the two adjacent cooling holes 28.

In an embodiment of the present invention, the method 200 may also include a controlling step 206, wherein the flow of cooling air 22 supplied to the tangential onboard injector may be controlled through a valve, such as a solenoid valve capable of being controlled via one or more feedback connections.

A further embodiment of method 200 of the present invention may also include a heating step 208, wherein cooling air 22 supplied to TOBI 24 may be heated by heater 60.

It should be understood, of course, that the foregoing relates to preferred embodiments of the invention and that modifications may be made without departing from the spirit and scope of the invention as set forth in the following claims.

We claim:

1. An apparatus, comprising:
a disk coverplate; the disk coverplate comprising:
a plurality of cooling holes; said cooling holes being in fluid communication with a flow of cooling air emanating from a tangential onboard injection nozzle; the disk coverplate disposed on a rotor assembly of a gas turbine engine; wherein the cooling holes are in fluid communication with a cooling conduit disposed within the rotor assembly for directing the flow of cooling air to provide cooling to a turbine blade of the gas turbine engine; wherein the distance between the centers of any two adjacent cooling holes is greater than 3 times the average diameter of the two adjacent cooling holes.

2. The apparatus of claim 1, wherein each of the plurality of cooling holes have about the same diameter.

3. The apparatus of claim 2, wherein the plurality of cooling holes are uniformly spaced radially about the disk coverplate.

4. A gas turbine engine comprising:
a compressor section;
a combustor section; and
a turbine section; wherein the turbine section comprises:
a rotor assembly; the rotor assembly comprising: a disk coverplate comprising: a plurality of cooling holes; said cooling holes being in fluid communication with a flow of cooling air emanating from a tangential onboard injection nozzle; wherein the cooling holes are in fluid communication with a cooling conduit for directing the flow of cooling air to provide cooling to a turbine blade disposed on the rotor assembly of the gas turbine engine; wherein the distance between the centers of any two adjacent cooling holes is greater than 3 times the average diameter of the two adjacent cooling holes, wherein the cooling air is supplied to the tangential onboard injection nozzle through a heater.

5. The gas turbine engine of claim 4, wherein the cooling air is produced in a combustion plenum of the gas turbine engine.

6. The gas turbine engine of claim 4, wherein cooling air is supplied to the tangential onboard injection nozzle through a solenoid valve.

7. The gas turbine engine of claim 6, wherein the solenoid valve is capable of being controlled via one or more feedback connections.

8. The apparatus of claim 4, further comprising a heater configured to supply heated cooling air to the plurality of cooling holes.

9. A gas turbine engine comprising:
a compressor section,
a combustor section, and
a turbine section, wherein the turbine section comprises: a rotor assembly, the rotor assembly comprising: a disk coverplate comprising: a plurality of cooling holes, said cooling holes being in fluid communication with a flow of cooling air emanating from a tangential onboard injection nozzle, wherein the coverplate holes are in fluid communication with a cooling conduit, the cooling air conduit being inwardly oriented in a direction of rotation of the rotor assembly for directing the flow of cooling air to provide cooling to a turbine blade disposed on the rotor assembly of the gas turbine engine, wherein the distance between the centers of any two adjacent cooling holes is greater than 3 times the average diameter of the two adjacent cooling holes, wherein each of the cooling holes have the same diameter, wherein the cooling holes are uniformly spaced radially about the disk coverplate, wherein the cooling air is produced in a combustion plenum of the combustor section, wherein the cooling air is supplied to the tangential onboard injection nozzle through a solenoid valve capable of being controlled via one or more feedback connections, and wherein the cooling air is supplied to the tangential onboard injection nozzle through a heater.

10. A system to control turbine cooling air flow in a gas turbine engine, the system comprising:
  a rotor assembly comprising:
    a disk coverplate comprising:
      a plurality of cooling holes, said cooling holes being in fluid communication with a flow of said cooling air emanating from a tangential onboard injection nozzle, wherein the coverplate holes are in fluid communication with a cooling conduit, the cooling air conduit being oriented in a direction of rotation of the rotor assembly for directing the flow of cooling air to provide cooling to a turbine blade disposed on the rotor assembly of the gas turbine engine, wherein the distance between the centers of any two adjacent cooling holes is greater than 3 times the average diameter of the two adjacent cooling holes; and
    a heater upstream of the tangential onboard injection nozzle, said heater in fluid communication with said cooling air, and said heater adapted for heating said cooling air.

11. The system of claim 10, further comprising a valve disposed upstream of the tangential onboard injection nozzle, wherein flow of cooling air through the valve is capable of being controlled via one or more feedback connections.

12. A method to control turbine cooling air flow comprising the steps of:
  a) setting a tangential onboard injector velocity of a flow of cooling air to be equal to a tangential velocity of at least one of a plurality of cooling holes of a disk coverplate, when the gas turbine engine is operating at a maximum power, the coverplate disposed on a rotor assembly of a gas turbine engine; wherein the tangential onboard injector velocity is defined as the tangential component of the velocity of the cooling air flow emanating from a tangential onboard injection nozzle, wherein said at least one of said plurality of cooling holes are in fluid communication with a cooling conduit to provide cooling to a turbine blade of the gas turbine engine;
  b) arranging a plurality of the cooling holes radially about the disk coverplate such that the distance between the centers of any two adjacent cooling holes is greater than 3 times the average diameter of the two adjacent cooling holes;
  c) a controlling step, wherein the flow of cooling air is supplied to the tangential onboard injection nozzle through a valve capable of being controlled via one or more feedback connections; and
  d) a heating step, wherein the cooling air is supplied to the tangential onboard injection nozzle through a heater.

* * * * *